(12) United States Patent
Roh

(10) Patent No.: US 10,359,195 B2
(45) Date of Patent: Jul. 23, 2019

(54) FUEL SUPPLY NOZZLE FOR MINIMIZING BURNING DAMAGE

(71) Applicant: DOOSAN HEAVY INDUSTRIES & CONSTRUCTION CO., LTD., Gyeongsangnam-do (KR)

(72) Inventor: Ujin Roh, Daejeon (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 359 days.

(21) Appl. No.: 15/160,837

(22) Filed: May 20, 2016

(65) Prior Publication Data
US 2016/0341427 A1 Nov. 24, 2016

(30) Foreign Application Priority Data
May 21, 2015 (KR) .................. 10-2015-0071066

(51) Int. Cl.
*F23R 3/28* (2006.01)
*F23D 11/38* (2006.01)
(Continued)

(52) U.S. Cl.
CPC ............... *F23R 3/28* (2013.01); *F02C 7/222* (2013.01); *F23D 11/38* (2013.01); *F23R 3/283* (2013.01);
(Continued)

(58) Field of Classification Search
CPC .... F23R 3/14; F23R 3/28; F23R 3/286; F23R 3/283; F23D 11/38; F23D 11/383; F23D 2900/14021; F23C 2900/07001
See application file for complete search history.

(56) References Cited

U.S. PATENT DOCUMENTS 3,675,853 A * 7/1972 Lapera .................. F23D 11/383
239/464
3,764,071 A * 10/1973 Carlisle .................. F23D 11/10
239/132.5
(Continued)

FOREIGN PATENT DOCUMENTS

EP 1 936 276 A1 6/2008
EP 2 842 638 A1 3/2015
(Continued)

OTHER PUBLICATIONS

Extended Search Report issued in corresponding European Application No. 16170544.7, dated Oct. 5, 2016, 8 pages.
(Continued)

*Primary Examiner* — William H Rodriguez
(74) *Attorney, Agent, or Firm* — Invenstone Patent, LLC

(57) ABSTRACT

A fuel supply nozzle for injecting fuel into a combustor in a shape of a pipe having an outer peripheral wall and an inner peripheral wall extended from a route to a tip. The fuel supply nozzle includes a first fuel discharge passage formed at the inside of the inner peripheral wall extending from the route to the tip, at least one or more vanes disposed on the outer peripheral wall spaced apart from the tip by a given distance and having vane fuel outlets communicating with the first fuel discharge passage, and a burning section formed on a given area adjacent to the tip to allow a thickness between the outer peripheral wall and the inner peripheral wall to be lower than the other section thereof.

14 Claims, 5 Drawing Sheets

(51) Int. Cl.
*F02C 7/22* (2006.01)
*F23R 3/36* (2006.01)

(52) U.S. Cl.
CPC ............... *F23R 3/286* (2013.01); *F23R 3/36* (2013.01); *F05D 2220/32* (2013.01)

(56) References Cited

U.S. PATENT DOCUMENTS

| | | | | |
|---|---|---|---|---|
| 5,228,283 A * | 7/1993 | Sciocchetti | ............... | F02C 3/30 |
| | | | | 60/737 |
| 5,613,363 A * | 3/1997 | Joshi | ............... | F23C 7/004 |
| | | | | 239/403 |
| 5,680,766 A * | 10/1997 | Joshi | ............... | F23C 7/004 |
| | | | | 239/405 |
| 5,697,553 A * | 12/1997 | Stotts | ............... | B05B 1/3442 |
| | | | | 239/406 |
| 5,761,907 A * | 6/1998 | Pelletier | ............... | F23D 11/107 |
| | | | | 239/397.5 |
| 5,799,871 A * | 9/1998 | Theurer | ............... | F23D 11/26 |
| | | | | 137/510 |
| 6,053,431 A * | 4/2000 | Hurley | ............... | B05B 1/3426 |
| | | | | 239/492 |
| 6,334,309 B1 * | 1/2002 | Dean | ............... | F23D 11/101 |
| | | | | 60/737 |
| 6,415,594 B1 * | 7/2002 | Durbin | ............... | F23R 3/286 |
| | | | | 60/748 |
| 8,079,218 B2 | 12/2011 | Widener | | |
| 8,511,087 B2 * | 8/2013 | Fox | ............... | F23R 3/14 |
| | | | | 60/737 |
| 8,636,504 B2 * | 1/2014 | Krieger | ............... | F23D 11/107 |
| | | | | 239/406 |
| 9,341,374 B2 * | 5/2016 | Ramier | ............... | F02C 3/22 |
| 9,822,980 B2 * | 11/2017 | Hawie | ............... | F23R 3/28 |
| 2005/0097889 A1 * | 5/2005 | Pilatis | ............... | F23D 11/107 |
| | | | | 60/743 |
| 2007/0074518 A1 * | 4/2007 | Rogers | ............... | F23R 3/286 |
| | | | | 60/776 |
| 2010/0077760 A1 * | 4/2010 | Laster | ............... | F23C 7/004 |
| | | | | 60/742 |
| 2010/0170267 A1 * | 7/2010 | Boettcher | ............... | F23D 11/36 |
| | | | | 60/796 |
| 2012/0151930 A1 * | 6/2012 | Patel | ............... | F23D 11/383 |
| | | | | 60/746 |
| 2015/0108236 A1 * | 4/2015 | Buelow | ............... | F01N 3/0253 |
| | | | | 239/5 |
| 2016/0186663 A1 * | 6/2016 | Stewart | ............... | F23R 3/286 |
| | | | | 60/737 |
| 2018/0010563 A1 * | 1/2018 | Ryon | ............... | F02M 61/162 |

FOREIGN PATENT DOCUMENTS

| | | |
|---|---|---|
| JP | 08-233271 | 9/1996 |
| JP | H10-019258 A | 1/1998 |
| JP | 2010-513838 A | 4/2010 |
| KR | 10-2011-0002179 A | 1/2011 |

OTHER PUBLICATIONS

Notice of Allowance issued in corresponding Korean Application No. 10-2015-0071066, dated Sep. 2, 2016, 3 pages.
A Japanese Office Action dated Sep. 18, 2018 in connection with Japanese Patent Application No. 2017-560589 which corresponds to the above-referenced U.S. application.

* cited by examiner

FUEL SUPPLY NOZZLE FOR MINIMIZING BURNING DAMAGE

CROSS-REFERENCE TO RELATED APPLICATIONS

This application claims priority to Korean Application No. 10-2015-0071066, filed May 21, 2015, the contents of which are incorporated herein in their entirety.

BACKGROUND

The present disclosure relates to a separable fuel supply nozzle so that the nozzle is easily and economically replaced when damaged, and more particularly, to a fuel supply nozzle that is configured to minimize burn range thereof when burning occurs on the end portion thereof, so that only the end portion of the nozzle having burn damage is replaced.

A turbine generator, which is generally used for gas turbine power generation, burns fuel with compressed air to generate strong energy and thus operates through the rotation of a turbine rotates. In this case, a substantially high temperature is formed on the end portion of a nozzle located in a combustor of the turbine generator where the burning occurs. Accordingly, in some cases the end portion of the nozzle may catch on fire melting the nozzle or causing damage, thereby causing it to lose its original function. Such damage is called burn damage.

In conventional practices, if the end portion of the nozzle is damaged due to the high temperature, the whole portion of the nozzle as well as the damaged end portion thereof is replaced, thereby incurring cost, time and labor. Also, it is hard to stop the development of the burn damage causing further damage to a large portion of the nozzle. Accordingly, there is a need to improve the design of a fuel supply nozzle wherein if burn damage occurs on the end portion of the nozzle, only the end portion of the nozzle with the burn damage can be exchanged with a new one, and further, the area of the nozzle on which the burn damage occurs can be minimized.

BRIEF SUMMARY

Accordingly, the present disclosure has been made in view of the above-mentioned problems occurring in the prior art, and it is an object of the present disclosure to provide a fuel supply nozzle that is capable of being protected from burning occurring in a combustor to the maximum, thereby minimizing the burn damage occurring thereon, and that is capable of replacing only the portion having burn damage with a new one.

To accomplish the above-mentioned object, according to the present disclosure, there is provided a fuel supply nozzle for injecting fuel into a combustor and having a shape of a pipe having an outer peripheral wall and an inner peripheral wall extended from a route to a tip. The fuel supply nozzle includes a first fuel discharge passage formed at the inside of the inner peripheral wall thereof in such a manner as to be extended from the route to the tip, at least one or more vanes disposed on the outer peripheral wall thereof in such a manner as to be spaced apart from the tip by a given distance and having vane fuel outlets communicating with the first fuel discharge passage, and a burning section formed on a given area adjacent to the tip in such a manner as to allow a thickness between the outer peripheral wall and the inner peripheral wall to be lower than the other section thereof.

According to the present disclosure, the fuel supply nozzle further includes a nozzle body extended from the route, and a nozzle cover coupled to the end portion of the nozzle body in such a manner as to allow the burning section to be formed thereon, wherein the nozzle body has a screw thread formed on the end portion coupled to the nozzle cover and the nozzle cover has a screw groove formed on the end portion coupled to the nozzle body in such a manner as to correspond to the screw thread.

According to the present disclosure, the fuel supply nozzle further includes a nozzle body extended from the route, and a nozzle cover coupled to the end portion of the nozzle body in such a manner as to allow the burning section to be formed thereon, wherein the nozzle body has a plurality of fixtures disposed along the outer periphery of the end portion coupled to the nozzle cover and the nozzle cover has a fixing groove formed on the end portion coupled to the nozzle body in such a manner as to be fastened to the plurality of fixtures.

According to the present disclosure, the burning section has a plurality of spaced machined portions formed thereon so that the thickness between the outer peripheral surface and the inner peripheral wall surrounding the first fuel discharge passage is lower than the other section.

According to the present disclosure, the machined portions are formed in such a manner as to allow the thickness between the outer peripheral wall and the inner peripheral wall to be in the range of 1 mm to 1.5 mm.

According to the present disclosure, the nozzle cover has a machined groove formed to a given depth along the outer peripheral surface thereof.

According to the present disclosure, the nozzle cover has a machined groove formed to a given depth along the outer peripheral surface thereof in such a manner as to be located on a position having no overlapping with the machined portions with the boundary of a point at which the formation of the machined portions is finished.

BRIEF DESCRIPTION OF THE DRAWINGS

The above and other objects, features and advantages of the present disclosure will be apparent from the following detailed description of the embodiments of the disclosure in conjunction with the accompanying drawings, in which.

DETAILED DESCRIPTION

Figure 1:
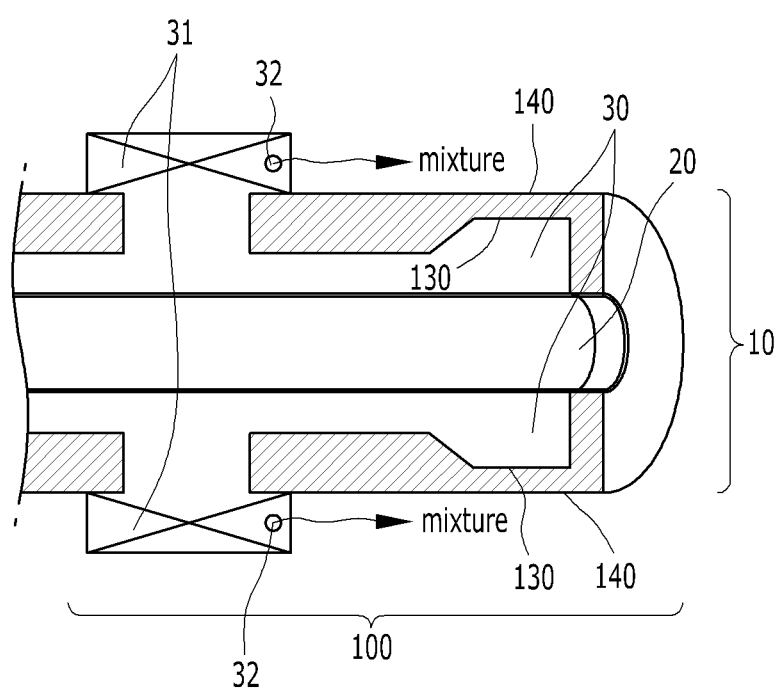
FIG. 1 is a sectional view of a fuel supply nozzle according to a first embodiment, wherein the fuel supply nozzle has a first fuel discharge passage and a second fuel discharge passage.

Hereinafter, an explanation on a fuel supply nozzle according to the present disclosure will be given in detail with reference to the attached drawing.

In the drawings, the corresponding parts in the embodiments of the present disclosure are indicated by corresponding reference numerals and repeated explanation on the corresponding parts will be avoided. Explanation of well known technology related to the present disclosure are avoided for purposes of brevity of the description.

Terms, such as the first, the second, A and B, may be used to describe various elements, but the elements should not be restricted by the terms. The terms are used to only distinguish one element from the other element. When it is said that one element is described as being "connected" or "coupled" to the other element, one element may be directly connected or coupled to the other element, but it should be understood that another element may be present between the two elements.

FIG. 1 is a sectional view of a fuel supply nozzle according to a first embodiment. With respect to the direction as shown in FIG. 1, hereinafter, the rightmost portion of a fuel supply nozzle 100 is a tip 10 and the opposite side to the tip 10 is a route. Also, the direction of the fuel supply nozzle 100 as shown in FIG. 1 is similarly situated as those in other figures.

The fuel supply nozzle 100 according to the first embodiment has a second fuel discharge passage 20 formed in the interior thereof so as to discharge liquid fuel at a high pressure, and the liquid fuel is supplied through the second fuel discharge passage 20. Further, the fuel supply nozzle 100 according to the first embodiment has a first fuel discharge passage 30 formed between the second fuel discharge passage 20 and an internal peripheral wall thereof, and thus, mixed gas with fuel and air is injected into the first fuel discharge passage 30. The tip 10 coming into contact with the end of the first fuel discharge passage 30 is closed so as not to allow the mixed gas to flow out along the first fuel discharge passage 30, and accordingly, the mixed gas flows toward vane 31 and is finally discharged to vane fuel outlets 32 formed on the vane 31.

The first fuel discharge passage 30 has an annular space so that the inside thereof is closed by means of the outer peripheral wall of the second fuel discharge passage 20 and the outside thereof is closed by means of an inner peripheral wall 130 and an outer peripheral wall 140 of the fuel supply nozzle 100.

Although not shown, a hollow space may be formed by means of the inner peripheral wall 130 and the outer peripheral wall 140 of the fuel supply nozzle 100 or may be filled with a metal material.

A thickness between the inner peripheral wall 130 and the outer peripheral wall 140 of the fuel supply nozzle 100 is not uniformly formed, and accordingly, a portion of the thickness therebetween may be lower than the other portion thereof, so that when burning occurs during the operation of the fuel supply nozzle 100, the portion at which the thickness is low melts first to prevent the whole portion of the fuel supply nozzle 100 from being damaged. Accordingly, the section in which the thickness between the inner peripheral wall 130 and the outer peripheral wall 140 is relatively lower than the other section is called a burning section.

Figure 2:
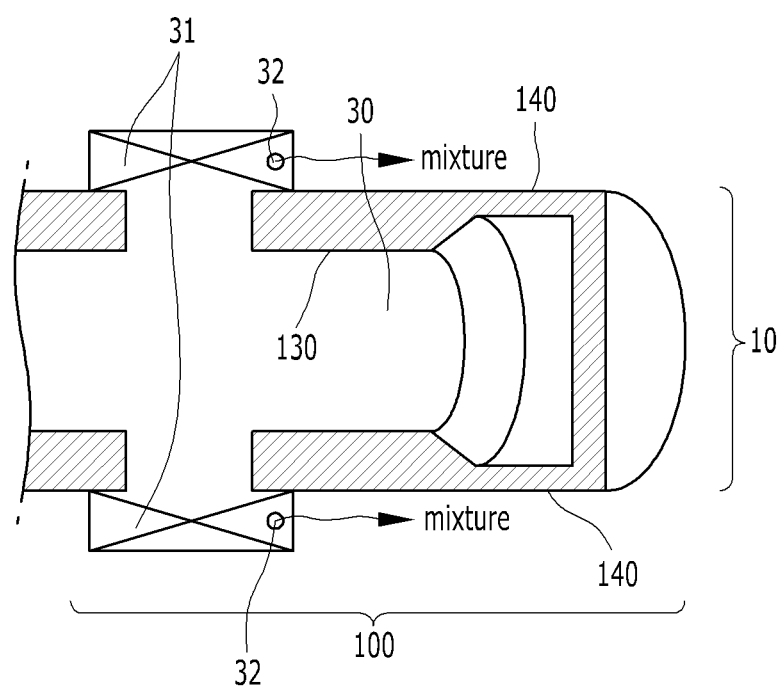
FIG. 2 is a sectional view of a fuel supply nozzle according to a second embodiment, wherein the fuel supply nozzle has a first fuel discharge passage.

FIG. 2 is a sectional view of a fuel supply nozzle according to a second embodiment, wherein there is no second fuel discharge passage 20 for injecting the liquid fuel. As shown, the fuel supply nozzle 100 has a single fuel discharge passage 30, without the second fuel discharge passage 20. In this case, the interior of the fuel supply nozzle 100 is filled with the mixed gas of fuel and air.

The fuel discharge passage 30 serves to supply the fuel to the vane fuel outlets 32 of the vane 31. Additionally, if the end portion of the fuel supply nozzle 100 is damaged by means of flashback generated from the vane fuel outlets 32 of the vane 31, the outer peripheral wall 140 and the inner peripheral wall 130 located on the end portion of the fuel supply nozzle 100 melt, and accordingly, the fuel is discharged from the tip 10 of the fuel supply nozzle 100 through the fuel discharge passage 30 open on the end portion of the fuel supply nozzle 100, thereby preventing the upstream side of the fuel discharge passage 30, that is, a nozzle body 110 as will be discussed later, from being additionally damaged by means of the burning.

In more detail, as shown in FIG. 1, the vane 31 is located on the upstream side of the flow of mixed gas discharged with respect to the tip 10, and if flashback is generated on the mixed gas injected from the vane fuel outlets 32, the flashback moves back to the upstream side adjacent to the side periphery of the tip 10. As the flashback moves back, it directly applies heat to the side periphery of the tip 10, so that the first fuel discharge passage 30, which is closed by means of the outer peripheral wall 140 and the inner peripheral wall 130, is open to allow the mixed gas to be injected into the downstream side of the vane 31 (to the right side in the drawing). Accordingly, if the outer peripheral wall 140 and the inner peripheral wall 130 melt to permit the first fuel discharge passage 30 to open, the mixed gas is discharged through the vane fuel outlets 32 of the vane 31 and through the first fuel discharge passage 30 being in open state, which causes a break in the burning section.

That is, during a normal operation, the first fuel discharge passage 30 discharges the mixed gas as fuel only through the vane fuel outlets 32, and if the front end of the fuel supply nozzle 100 melts or is broken due to the burn damage, the fuel is discharged through the outer peripheral wall 140 and the inner peripheral wall 130 being in a melted state.

The broken portion of the fuel supply nozzle 100 due to the melting and opening is located more on the downstream side than the vane 31 and injects the mixed gas at the flow rate higher than the vane fuel outlets 32, so that flames move to the downstream side of the broken portion of the fuel supply nozzle 100, and accordingly, the flashback occurring on the fuel supply nozzle 100 will stop.

Upon the generation of flashback, particularly, so as to open the first fuel discharge passage 30 through easy melting of the outer peripheral wall 140 and the inner peripheral wall 130 of the fuel supply nozzle 100, a portion of the thickness between the outer peripheral wall 140 and the inner peripheral wall 130 is configured to be low. The portion at which the thickness is low is broken upon the generation of flashback, and as the portion at which the thickness is low is adjusted in position, the breaking portion can be intentionally controlled. According to the present disclosure, a portion of the thickness between the outer peripheral wall 140 and the inner peripheral wall 130 of the fuel supply nozzle 100, which is adjacent to the tip 10, is low to effectively remove the flashback. As the portion close to the tip 10 is broken, effects moving the flames to the downstream side become strong.

As shown in FIG. 2, the fuel supply nozzle 100 according to the second embodiment has only a single fuel discharge passage 30, without second fuel discharge passage 20.

According to the first embodiment as shown in FIG. 1, the mixed gas as fuel and the liquid fuel are discharged through their respective discharge passages. On the other hand, as shown in FIG. 2, the fuel supply nozzle 100 according to the second embodiment uses only the mixed gas as fuel and discharges the mixed gas to the vane fuel outlets 32 through the fuel discharge passage 30. In the same manner as the first embodiment, a portion of the thickness between the outer peripheral wall 140 and the inner peripheral wall 130 of the fuel supply nozzle 100 according to the second embodiment is low, so that the portion may easily melt or be broken upon generation of flashback.

Figure 3:
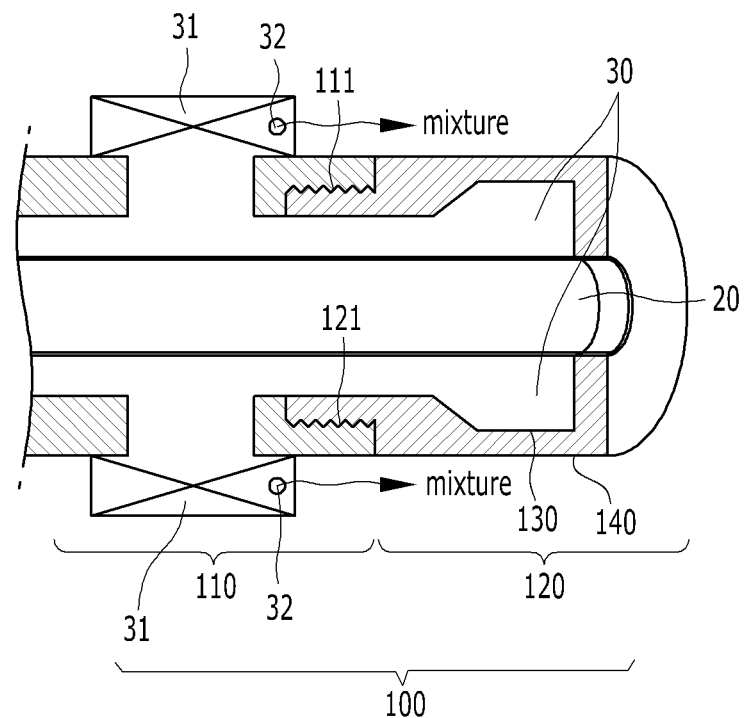
FIG. 3 is a sectional view of a fuel supply nozzle according to a third embodiment, wherein the fuel supply nozzle has a screw thread and a screw groove.

FIG. 3 is a sectional view of a fuel supply nozzle having a screw thread 111 and a screw groove 121 according to a third embodiment.

A fuel supply nozzle 100, which has a configuration as shown in FIG. 3, has an exchangeable portion. Under a screw fastening structure as shown in FIG. 3, the parts of the fuel supply nozzle 100 are separated and assembled from/to each other. In more detail, a nozzle body 110 and a nozzle cover 120 of the fuel supply nozzle 100 are separated and assembled from/to each other by means of the screw fastening structure 111 and 121.

For example, if burning occurs on the end portion of the fuel supply nozzle 100 from the mixed gas discharged through the vane fuel outlets 32 of the vane 31, the nozzle cover 120 may melt or be broken more easily than the nozzle body 110 in view of the position of the flames.

According to the third embodiment, the low thickness portion between the outer peripheral wall 140 and the inner peripheral wall 130 forming the first fuel discharge passage 30 in cooperation with the second fuel discharge passage 20 is formed on the nozzle cover 120, so that the portion broken due to flashback exists only on the nozzle cover 120. When the fuel supply nozzle 100 is repaired after the burn damage, accordingly, only the nozzle cover 120 melted or broken is simply separated from the fuel supply nozzle 100 through the screw fastening structure 111 and 121, thereby being rapidly exchanged with new nozzle cover 120.

Figure 4:
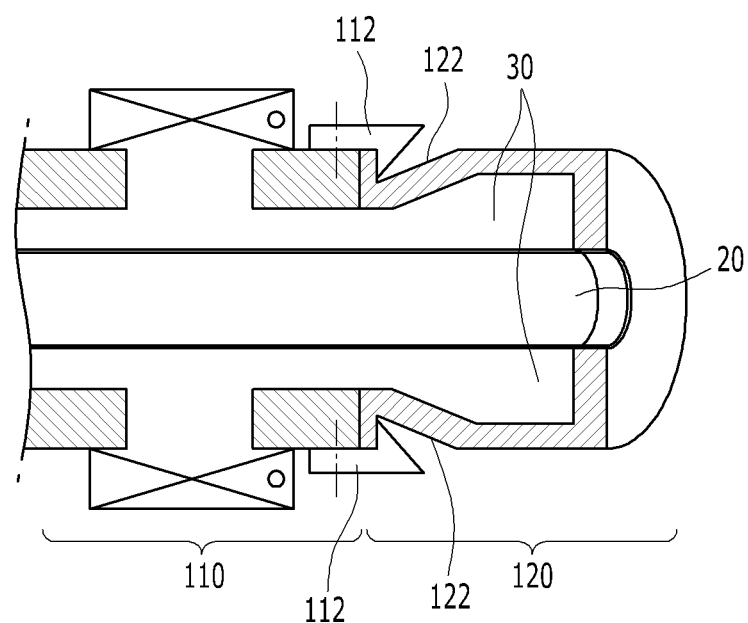
FIG. 4 is a sectional view of a fuel supply nozzle according to a fourth embodiment, wherein the fuel supply nozzle has fixtures and a fixing groove.

FIG. 4 is a sectional view of a fuel supply nozzle having fasteners 112 and a fixing groove 122 according to a fourth embodiment.

According to the fourth embodiment, the nozzle cover 120 melted or damaged can be easily exchanged with new one, and instead of the screw fastening structure as shown in FIG. 3, fasteners 112 and a fixing groove 122 are provided.

A coupling structure between the fasteners 112 and the fixing groove 122 is made in a manner where claw bent from an end portion of each of the fasteners 112 arranged in a circumferential direction along the outer peripheral surface of the nozzle body 110 lock onto the projection of the fixing groove 122 formed on the nozzle cover 120.

Under the coupling structure between the fasteners 112 and the fixing groove 122, if it is desired to couple the nozzle cover 120 to the nozzle body 110, the nozzle cover 120 is insertedly fitted to the nozzle body 110 with the application of a given force thereto, and as a result, the protrusion portions (claws) of the fasteners 112 are elastically fixed onto the fixing groove 122.

On the other hand, if it is desired to separate the nozzle cover 120 from the nozzle body 110, the protrusion portions (claws) of the fasteners 112 are lifted up and disengaged from the fixing groove 122, and the nozzle cover 120 is removed.

Figure 5:
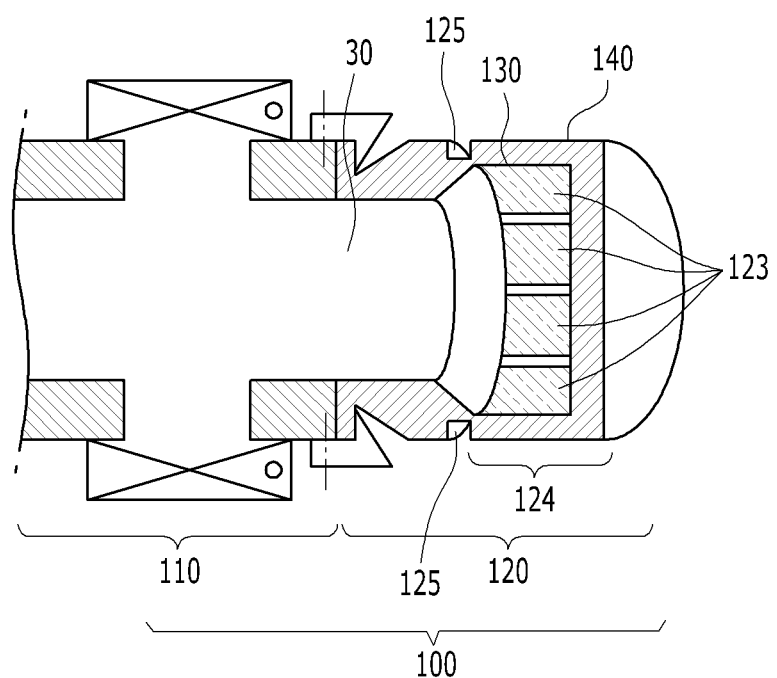
FIG. 5 is a sectional view of a fuel supply nozzle according to a fifth embodiment, wherein the fuel supply nozzle has a plurality of machined portions and a machined groove formed on a nozzle cover and an outer periphery of the rear end portion thereof.

FIG. 5 is a sectional view of a fuel supply nozzle according to a fifth embodiment, wherein the fuel supply nozzle has a plurality of machined portions 123 and a machined groove 125 formed on a nozzle cover 120 and an outer periphery of the rear end portion thereof.

An end portion 124 of a nozzle cover 120 has a low thickness between the inner peripheral wall 130 and the outer peripheral wall 140 surrounding the outer periphery of an end portion of the fuel discharge passage 30, and through the formation of the end portion 124 having low thickness, accordingly, burn damage to the whole portion of the fuel supply nozzle 100 can be prevented.

Instead of the formation of the end portion 124 having low thickness over the whole inner peripheral surface of the nozzle cover 120, according to the fifth embodiment, only a given portion at the interior of the nozzle cover 120 has a low thickness. For example, as shown in FIG. 5, a plurality of grooves is formed in a longitudinal direction at the inner peripheral surface of the end portion 124 of the nozzle cover 120, thereby allowing the thickness of the end portion 124 of the nozzle cover 120 to be partially low. The grooves are formed circumferentially, slanted, or in a variety of forms, and such grooves are called machined portions 123.

The machined portions 123 are formed in such a manner as to allow the thickness between the outer peripheral wall 140 and the inner peripheral wall 130 to be in the range of 1 mm to 1.5 mm. In addition, the formation of a machined groove 125 to a given depth along the outer peripheral surface of a nozzle cover 120 also prevents the nozzle body 110 from being damaged as described in more detail below.

Figure 6:
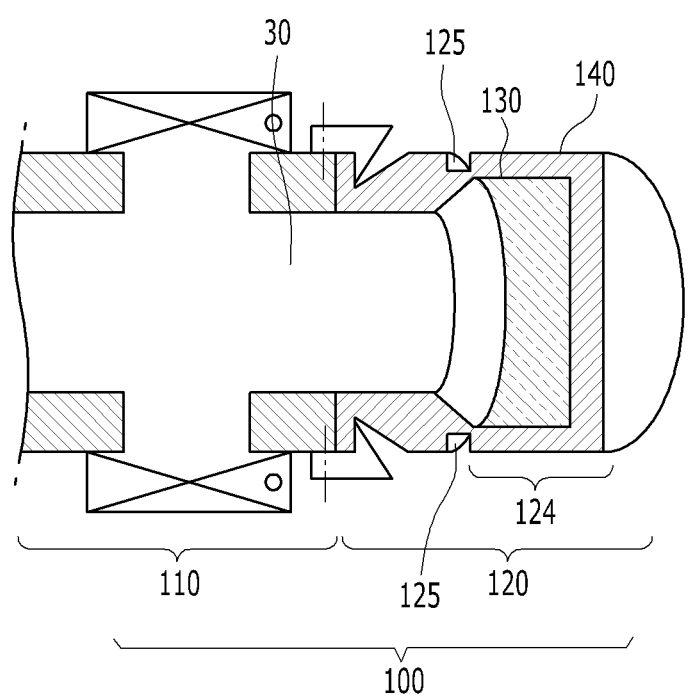
FIG. 6 is a sectional view of a fuel supply nozzle according to a sixth embodiment, wherein the fuel supply nozzle has a machined groove formed on the outer periphery of the nozzle cover machined to have a low thickness.

FIG. 6 is a sectional view of a fuel supply nozzle having a machined groove formed on a nozzle cover according to a sixth embodiment. According to the sixth embodiment, the formation of a machined groove 125 to a given depth along the outer peripheral surface of a nozzle cover 120 prevents the whole portion of the fuel supply nozzle 100 from being damaged.

The burning occurring from the end portion 124 moves toward the nozzle body 110, and in this process, flashback comes into contact with the machined groove 125. In this case, the formation of the machined groove 125 allows a thickness between the outer peripheral wall 140 and the inner peripheral wall 130 to be low (for example, in the range of 1 mm to 1.5 mm), so that the end portion 124 melts and becomes separated from the fuel supply nozzle at the boundary of the machined groove 125, thereby preventing additional burn damage from being applied to the whole portion of the fuel supply nozzle 100.

As shown in FIGS. 5 and 6, in this case, the machined portions 123 and the machined groove 125 are formed on the inner peripheral surface and the outer peripheral surface of the end portion 124 of the nozzle cover 120, respectively, but they may be formed on the opposite surfaces to the surfaces shown. Alternatively, they may be formed on both of the inner peripheral surface and the outer peripheral surface of the end portion 124 of the nozzle cover 120.

Further, the machined portions 123 and the machined groove 125 may be formed together on a single fuel supply nozzle 100. At this time, the machined groove 125 may be formed on the outer peripheral surface of the nozzle cover 120 with the boundary of the point at which the formation of the machined portions 123 is finished in such a manner as to be not overlapped with the machined portions 123. This is because a portion at which the thickness between the outer peripheral wall 140 and the inner peripheral wall 130 is too low is formed when the machined portions 123 and the machined groove 125 are overlapped with each other. As a result, the formation of such portion is prevented in consideration of the durability of the fuel supply nozzle 100.

The nozzle cover 120 may further be configured such that there is a difference between the metal material constituting the end portion 124 of the nozzle cover 120 and the metal material constituting the other portion thereof, that is, a difference between melting points, thereby achieving the effects of the present disclosure more reliably.

In more detail, the metal material constituting the end portion 124 of the nozzle cover 120 may have a melting point that is lower than a temperature upon burning, and the metal material constituting the other portions of the nozzle cover 120 may have a melting point higher than a temperature upon burning, so that the end portion 124 of the nozzle cover 120 melts first, thereby preventing the burning from being developed further, and only the nozzle cover 120 is exchanged with new one, thereby fully finishing the repair of the fuel nozzle cover 100.

As described above, the fuel supply nozzle according to the present disclosure is separable so that when the nozzle is damaged, it may be replaced with a new one easily and economically, while minimizing the burn damage occurring thereon, and only the portion having burn damage is replaced with a new one, thereby reducing the time needed for repairing the nozzle.

The embodiments discussed have been presented by way of example only and not as a limitation. For example, the screw thread 111 and screw groove 121 disclosed in the third embodiment and the fasteners 112 and fixing groove 122 of the fourth embodiment may be applied to the fuel supply nozzle 100 of the second, fifth, and sixth embodiments. Similarly, the machined portions 123 and machined groove 125 of the fifth and sixth embodiment may be applied to the fuel supply nozzle of 100 of the first embodiment or the nozzle cover 120 of the third and fourth embodiments. Thus, the breadth and scope of the disclosure should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the disclosure(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any disclosure(s) in this disclosure. Neither is the "Brief Summary" to be considered as a characterization of the disclosure(s) set forth in the claims found herein.

Furthermore, any reference in this disclosure to "disclosure" in the singular should not be used to argue that there is only a single point of novelty claimed in this disclosure. Multiple disclosures may be set forth according to the limitations of the multiple claims associated with this disclosure, and the claims accordingly define the disclosure(s), and their equivalents, that are protected thereby. In all instances, the scope of the claims shall be considered on their own merits in light of the specification, but should not be constrained by the headings set forth herein.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above teachings. It is therefore intended that the scope of the disclosure be limited not by this detailed description, but rather by the claims appended hereto.

What is claimed is:

1. A fuel supply nozzle for injecting fuel into a combustor and having inner and outer peripheral walls extending from a fuel route to a tip, the fuel supply nozzle comprising:
   a nozzle body disposed toward the fuel route;
   a first fuel discharge passage formed by the inner peripheral wall and configured to discharge a mixed gas of fuel and air;
   at least one vane disposed on the outer peripheral wall and spaced apart from the tip, the at least one vane including a fuel outlet communicating with the first fuel discharge passage; and
   an end portion disposed at the tip including
      a burning section disposed adjacent to the tip, and
      a remaining section disposed between the burning section and the nozzle body,
   wherein the burning section has a thickness that is less than a thickness of the remaining section of the end portion, and
   wherein the burning section includes one or more machined portions that are formed on the inner peripheral wall of the end portion and form a plurality of grooves.

2. The fuel supply nozzle according to claim 1, further comprising:
   a nozzle cover including the burning section; and
   a screw fastening structure for coupling the nozzle cover to the nozzle body using screw threads.

3. The fuel supply nozzle according to claim 1, further comprising:
   at least one fastener disposed along an outer periphery of an end of the nozzle body to extend in a direction of the fuel route; and
   a nozzle cover having a fixing groove configured to receive the at least one fastener of the nozzle body, the nozzle cover including the burning section.

4. The fuel supply nozzle according to claim 2, wherein the nozzle cover includes a machined groove formed circumferentially around the outer peripheral wall.

5. The fuel supply nozzle according to claim 3, wherein the nozzle cover includes a machined groove formed circumferentially around the outer peripheral wall.

6. The fuel supply nozzle according to claim 1, wherein the thickness between the outer peripheral wall and the inner peripheral wall of the one or more machined portions is in the range of 1 mm to 1.5 mm so that the burning section of the end portion may melt before the nozzle body.

7. The fuel supply nozzle according to claim 1, further including a second fuel discharge passage for discharging a liquid fuel and extending from the fuel route to the tip, wherein the first fuel discharge passage is coaxial to the second fuel discharge passage.

8. The fuel supply nozzle according to claim 1, wherein two or more of the machined portions are spaced apart along the inner peripheral wall.

9. The fuel supply nozzle according to claim 1, wherein the burning section includes a machined groove formed circumferentially around the outer peripheral wall.

10. The fuel supply nozzle according to claim 9, wherein the thickness of the end portion at the machined groove is in the range of 1 mm to 1.5 mm so that, when excessive heat is applied to the outer peripheral wall at the end portion, be separated from the fuel supply nozzle at the machined groove.

11. The fuel supply nozzle according to claim 1, further including a second fuel discharge passage for discharging a liquid fuel and extending from the fuel route to the tip, wherein the first fuel discharge passage is coaxial to the second fuel discharge passage.

12. The fuel supply nozzle according to claim 1, wherein the thickness of the end portion at the plurality of grooves is in the range of 1 mm to 1.5 mm so that, when excessive heat is applied to the outer peripheral wall at the end portion, the end portion may be melted to open the first fuel discharge passage.

13. The fuel supply nozzle according to claim 1, wherein the plurality of grooves reduce the thickness of the burning section at each of the grooves.

14. A fuel supply nozzle for injecting fuel into a combustor and having inner and outer peripheral walls extending from a fuel route to a tip, the fuel supply nozzle comprising:
a first fuel discharge passage formed by the inner peripheral wall and configured to discharge a mixed gas of fuel and air;
at least one vane disposed on the outer peripheral wall and spaced apart from the tip, the at least one vane including a fuel outlet communicating with the first fuel discharge passage; and
an end portion disposed at the tip including
a burning section disposed adjacent to the tip, and
a remaining section disposed adjacent to the burning section, the remaining section having a thickness that is greater than a thickness of the burning section,
wherein the outer peripheral wall includes a machined groove formed circumferentially around the burning section to reduce the thickness of the burning section at the machined groove.

* * * * *